(12) United States Patent
Chen et al.

(10) Patent No.: US 11,792,575 B1
(45) Date of Patent: Oct. 17, 2023

(54) ELECTRONIC DEVICE WITH FLEXIBLE HOUSINGS

(71) Applicant: Apple Inc., Cupertino, CA (US)

(72) Inventors: Yue Chen, San Jose, CA (US); Joshua A. Hoover, Los Gatos, CA (US); Daniel A. Podhajny, Morgan Hill, CA (US); Nicholas R. Trincia, San Francisco, CA (US); Seul Bi Kim, Sunnyvale, CA (US); Chad J. Miller, Oakland, CA (US); Kristen L. Cretella, Mountain View, CA (US); Yi Zou, Santa Clara, CA (US); William Leith, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/381,008

(22) Filed: Jul. 20, 2021

Related U.S. Application Data

(60) Provisional application No. 63/081,226, filed on Sep. 21, 2020.

(51) Int. Cl.
    *H04R 9/06*     (2006.01)
    *H04R 9/04*     (2006.01)
    (Continued)

(52) U.S. Cl.
    CPC ............... *H04R 9/06* (2013.01); *H04R 9/045* (2013.01); *B32B 5/26* (2013.01); *B32B 2457/00* (2013.01);
    (Continued)

(58) Field of Classification Search
    CPC .... H04R 9/06; H04R 9/045; H04R 2307/029; B32B 5/26; B32B 2457/00;
    (Continued)

(56) References Cited

U.S. PATENT DOCUMENTS

| 8,300,858 B2 | 10/2012 | Nakaya et al. |
| 10,577,732 B1 * | 3/2020 | Podhajny ................. F21S 4/15 |

(Continued)

FOREIGN PATENT DOCUMENTS

| CN | 201758434 U | * | 3/2011 |
| CN | 201758434 U | | 3/2011 |

(Continued)

OTHER PUBLICATIONS

Aarmen Yildirim et al., Roll-to-Roll Production of Novel Large-Area Piezoelectric Films for Transparent, Flexible, and Wearable Fabric Loudspeakers, Advanced Materials Technologies, Jun. 8, 2020, pp. 1-11, vol. 5, Issue 7, Google Scholar.

*Primary Examiner* — Angelica M McKinney
(74) *Attorney, Agent, or Firm* — TREYZ LAW GROUP, P.C.; David K. Cole

(57) ABSTRACT

An electronic device may be formed from acoustically permeable textile layers and voice coil layers. The voice coil layers may output sound through the textile layers. The textile layers and voice coil layers may be foldable or bent in one or more directions to allow the electronic device to be placed in expanded, collapsed, or folded configurations to allow for improved portability. Additionally, the textile layers and voice coil layers may be folded or bent to place the electronic device in cylindrical, conical, and other configurations to allow for improved sound output from the voice coil layers. The electronic device may also include light-emitting components between the textile layers that emit light through one of the textile layers to form indicators or images for a user of the device. The electronic device may have a plurality of sensors to allow user interactions to control the output of the electronic device.

19 Claims, 11 Drawing Sheets

(51) Int. Cl.
  *F21V 33/00* (2006.01)
  *B32B 5/26* (2006.01)

(52) U.S. Cl.
  CPC ....... *F21V 33/0008* (2013.01); *F21V 33/0056* (2013.01); *H04R 2307/029* (2013.01)

(58) Field of Classification Search
  CPC . F21V 33/0008; F21V 33/0056; D02G 3/441; G01D 11/30; H01L 23/5387; H01L 23/3121; H01L 23/5386; H01L 25/0753; H01L 33/56; H01L 21/4853; H01L 24/16; H01L 33/62; H01L 2224/16225; H01L 2224/16227; H01L 2924/15174; H01L 2933/0091; H05K 1/038; H05K 1/189; H05K 1/0283; H05K 3/284; H05K 2201/10106; H05K 2201/2009; A41D 1/005; F21Y 2115/10
  See application file for complete search history.

(56) References Cited

U.S. PATENT DOCUMENTS

| | | | |
|---|---|---|---|
| 10,603,527 B2 | 3/2020 | Namm | |
| 10,900,154 B2 * | 1/2021 | Podhajny | ............ F21V 19/0025 |
| 11,120,672 B2 * | 9/2021 | Eryilmaz | ................ G08B 6/00 |
| 11,194,396 B1 * | 12/2021 | Wang | ....................... G06F 3/016 |
| 11,388,817 B2 * | 7/2022 | Sunshine | ............... H05K 1/038 |
| 2011/0197742 A1 * | 8/2011 | Liotta | ................. H04R 1/1033 |
| | | | 84/730 |
| 2014/0070957 A1 * | 3/2014 | Longinotti-Buitoni | ..................... |
| | | | A61B 5/02055 |
| | | | 340/870.01 |
| 2015/0370320 A1 * | 12/2015 | Connor | ............... A61B 5/1121 |
| | | | 345/173 |
| 2017/0251555 A1 * | 8/2017 | Sunshine | ............ D03D 15/533 |
| 2019/0013274 A1 * | 1/2019 | Sunshine | ............ H01L 23/5386 |
| 2019/0013275 A1 * | 1/2019 | Sunshine | ............ H01L 23/5386 |

FOREIGN PATENT DOCUMENTS

| | | | | |
|---|---|---|---|---|
| JP | 2003061175 A | * | 2/2003 | |
| JP | 2003268609 A | * | 9/2003 | ............ A41D 1/005 |
| JP | 2009164818 A | * | 7/2009 | |
| JP | 2020166343 A | * | 10/2020 | |

* cited by examiner

ELECTRONIC DEVICE WITH FLEXIBLE HOUSINGS

This application claims the benefit of provisional patent application No. 63/081,226, filed on Sep. 21, 2020, which is hereby incorporated by reference herein in its entirety.

FIELD

This relates generally to electronic devices and, more particularly, to electronic devices with flexible housings.

BACKGROUND

Electronic devices may include acoustic components, such as speakers, and light-emitting components, such as displays and other components. It can be challenging to incorporate components such as these into an electronic device that is flexible and portable. If care is not taken, the device may not be sufficiently portable or may have compromised functionality.

SUMMARY

An electronic device may be formed from outer acoustically permeable textile layers and internal voice coil layers that emit sound through the textile layers. The electronic device may have associated control circuitry that drives the voice coil layers and produces sound. Both the textile layers and the voice coil layers may be flexible and foldable. For example, the textile layers and voice coil layers may be folded in an accordion shape or other desired shape and may be placed in an expanded configuration, a collapsed configuration, a bent configuration, a cylindrical configuration, and/or a conical configuration. In this way, the portability of the electronic device may be improved while preserving its functionality.

The voice coil layers may be formed from conductive strands in a fabric, or printed traces on a flexible substrate. In either case, the voice coils may surround at least a portion of a magnetic member. In this way, an electric field may be formed to drive the voice coil and produce sound.

In addition to the voice coil layers, the electronic device may include light-emitting elements between the textile layers, sensor layers between the textile layers, or any other desired input-output device layers that emit an output or receive an input through the textile layers. These other input-output device layers may also be flexible to maintain the overall flexibility, expandability, and compressibility of electronic device. In one example, the device may include a display having a plurality of pixels that display images through the textile layers.

The electronic device may include communications circuitry that receives signals, and the control circuitry may drive the voice coil layers and/or the other input/output layers in response to the received signals. For example, the electronic device may receive wireless signals (e.g., audio signals) from an external device and output sound (e.g., audio) in response to the wireless signals.

The electronic device may be a standalone portable electronic device or may be incorporated into a fabric-based item. For example, the device may form part of a cover for an external electronic device, may be incorporated into the fabric of a garment that a user may wear, or may be incorporated into a wristband for a wristwatch device (e.g., a smart watch). The flexible textile layers, voice coil layers, and other input/output layers may allow the electronic device to bend, fold, compress, expand, or otherwise change shape as desired/needed, thereby allowing the associated article to maintain flexibility.

DETAILED DESCRIPTION

Electronic devices may be provided with components for providing users with output and gathering input from the users and from the environment. For example, the device may provide corresponding audio and visual output, and the device may receive inputs from external devices, from user selections through input devices such as buttons and sensors, and from sensors that detect environmental conditions. In some cases, these electronic devices may be flexible to promote portability and functionality.

Figure 1:
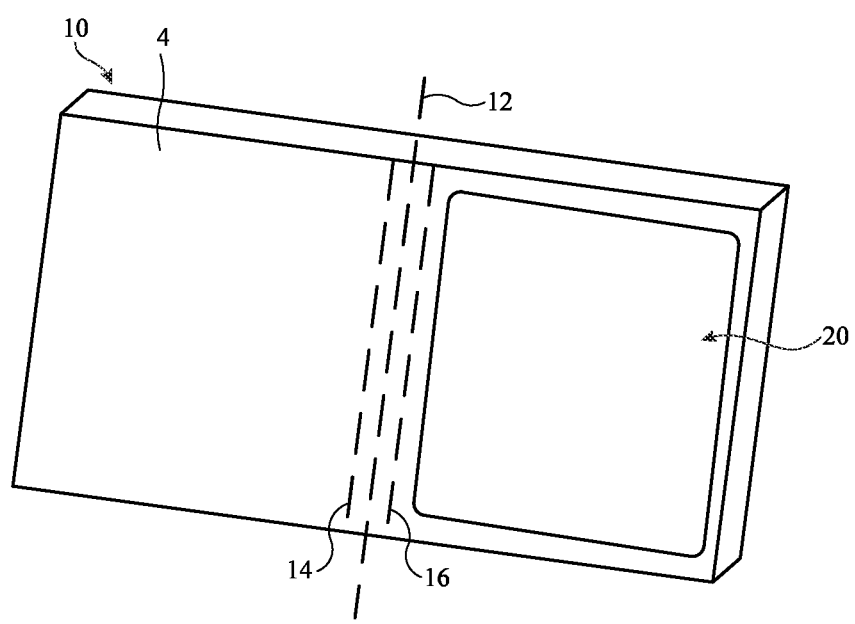
FIG. 1 is a perspective view of an illustrative electronic device and case that incorporates a flexible electronic device in accordance with an embodiment.

An illustrative flexible electronic device is shown in FIG. 1. Electronic device 10 of FIG. 1 may form a cover for electronic device 20, which together may form a system of electronic devices. Electronic device 10 may be attached to electronic device 20 using a magnet, or may have a physical opening to house electronic device 20, as examples. Electronic device 20 may be a computing device such as a voice-controlled assistant, a laptop computer, a computer monitor containing an embedded computer, a tablet computer, a cellular telephone, a media player, other handheld or portable electronic devices, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Device 10 may having housing 4, which may fold at foldable regions 14 and 16 along axis 12 to cover electronic device 20 when not in use. In some cases, it may be desirable to include electronic components within housing 4 that provide output to a user. For example, electronic device 10 may include speakers, light-emitting components, haptic components, or any other output components. Alternatively or additionally, electronic device 10 may include input components, such as microphones, buttons, or input sensors.

Device 10 may communicate with device 20. For example, device 10 may receive and/or transmit information to device 20 over a wireless connection (e.g., a Bluetooth® connection). In other embodiments, device 10 may receive and/or transmit information to device 20 over a wired connection (e.g., device 10 may be plugged into a port within device 20). In some embodiments, device 10 may receive information, such as audio data, from device 20, and emit sound, play music, or play other audio files for a user. In these embodiments, device 10 may form a flexible speaker that overlays device 20 when device 20 is not in use. However, this is merely illustrative. In general, device 10 may include any desired electronic components.

Figure 2:
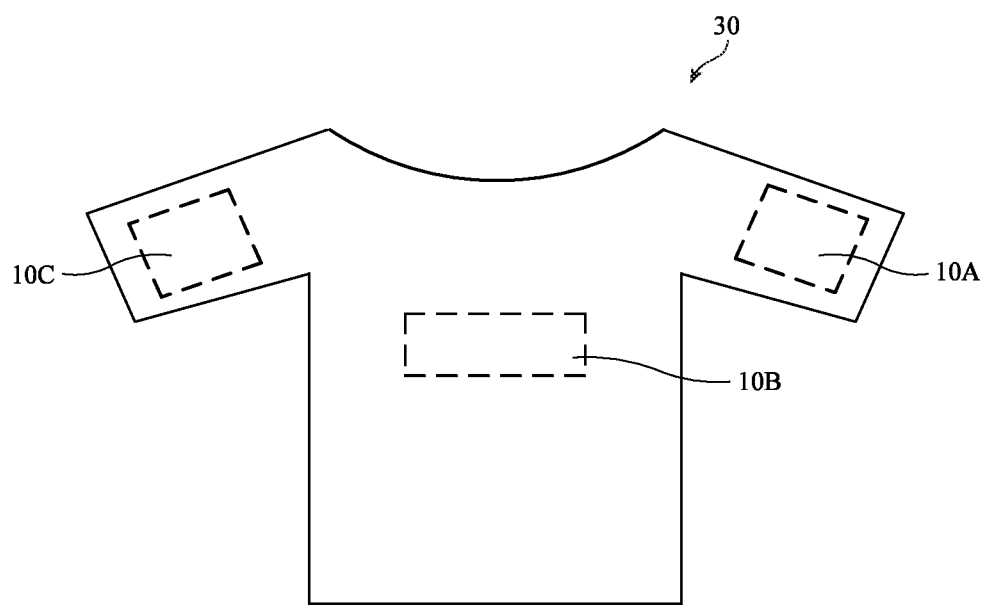
FIG. 2 is a front view of an illustrative article of clothing that incorporates a flexible electronic device in accordance with an embodiment.
Figure 3:
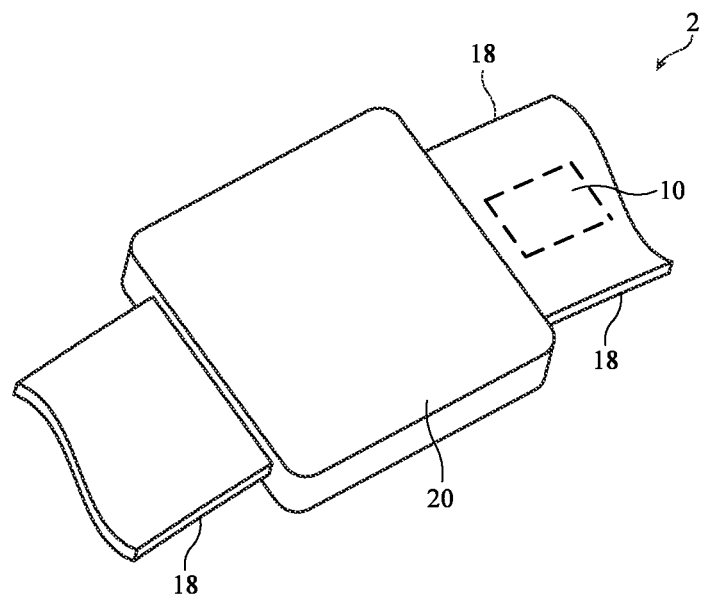
FIG. 3 is a perspective view of an illustrative wearable electronic device that incorporates a flexible electronic device in accordance with an embodiment.

Other embodiments in which electronic device 10 may have flexible housing structures are shown in FIGS. 2 and 3. As shown in FIG. 2, electronic device 10 may be incorporated into an article of clothing, such as garment 30. Garment 30 may be a shirt, jacket, pants, dress, undergarment, or any other desired garment. If desired, electronic device 10 may have a fabric housing, and may be sewn, woven, knitted, or otherwise coupled to the surrounding fabric of garment 30. For example, electronic device 10 may be located in positions 10A, 10B, and/or 10C. Electronic device 10 may have audio components that output audio to a user of the device, light-emitting components that alert a user/change the appearance of garment 30, a display to display content on garment 30, input components, or any other desired electronic components. Although electronic device 10 is shown as being located in positions 10A-C (e.g., on a sleeve of garment 30 in positions 10A and 10C and on a central region of garment 30 in position 10B), these locations are merely illustrative. In general electronic device 10 may be incorporated into garment 30 at any desired location, and may be integrally formed with garment 30, if desired.

As shown in FIG. 3, system 2 may be a wristwatch device. Electronic device 20 may be attached to band 18, which in turn may be formed from and/or include electronic device 10. Electronic device 20 may have a display, audio components, buttons, sensors, and other components, and may be in wireless and/or wired communication with electronic device 10 within band 18. Although electronic device 10 is shown as being a portion of band 18, electronic device 10 may form the entirety of band 18 if desired.

Other configurations may be used for device 10 if desired. The examples of FIGS. 1-3 are merely illustrative. For example, device 10 may be incorporated into or may be a voice-controlled assistant or a cover for a voice-controlled assistant, a laptop computer or a cover for a laptop computer, a computer monitor containing an embedded computer, a tablet computer or a cover for a tablet computer, a cellular telephone or a cover for a cellular telephone, a media player or a cover for a media player, other handheld or portable electronic devices or a cover for the handheld or portable electronic devices, a smaller device such as a wristwatch device (e.g., a watch with a wrist strap) or a cover or wrist strap for the wristwatch device, a pendant device or a chain or cover for the pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Figure 4:
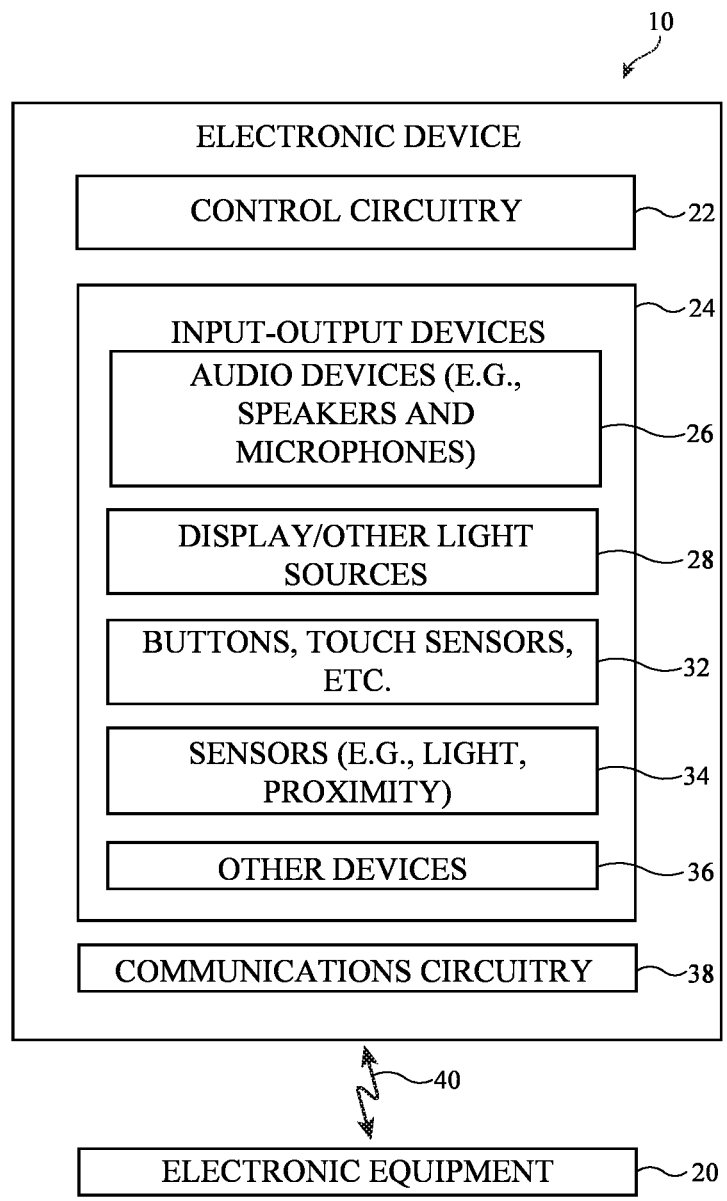
FIG. 4 is a diagram of an illustrative electronic device in accordance with an embodiment.

A schematic diagram of electronic device 10 is shown in FIG. 4. Electronic device 10 may communicate with external equipment such as electronic device 20 (or any other electronic equipment/devices) using communications link 40. Communications link 40 may be a wireless local area network link, a cellular telephone communications link, other short or long range wireless link, may be a wired link (e.g., an Ethernet link, auxiliary cable link, optical link, etc.), and/or may be any other suitable communications path. Electronic device 10 may be controlled by external equipment/device 20, may be a peer device, and/or may be a controller or other accessory for device 20. External equipment 20 may be a computing device such as a voice-controlled assistant, a laptop computer, a computer monitor containing an embedded computer, a tablet computer, a cellular telephone, a media player, other handheld or portable electronic devices, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Device 10 may use communications circuitry 38 to support communications with electronic equipment 20 over link 40. Communications circuitry 38 may include wired and wireless communications circuitry (e.g., a wireless transceiver such as a wireless local area network transceiver and/or cellular telephone transceiver, antennas, etc.). Using communications circuitry 40, device 10 can gather information from a server or other online equipment (e.g., equipment 20) over the internet. For example, device 10 can obtain information on the current weather from a weather server, can obtain news, stock quotes, sports scores, travel information such as transportation schedules, can download email into an inbox supported by device 10, etc.

Information on the current weather, the current temperature, and/or other sensor information (e.g., air pressure, humidity, etc.) may be used in determining how to adjust displays and/or other light-emitting devices in device 10. If, for example, the temperature is cold, device 10 may use display 28 or other light sources to display cold colors (e.g., blue). In response to detecting that the temperature is warm (e.g., by obtaining online temperature information from an online weather source, by using a thermometer, etc.), device 10 may use display 28 or other light sources to display warm colors (e.g., yellow). Device 10 may also display mood lighting, decorative patterns, and/or other visual content (bar graphs, icons, text, etc.) that varies depending on other parameters (e.g., indoor temperature, time of day, received text message count, email inbox message count, online information such as sports scores, stock prices, weather, news, etc.). As an example, device 10 may glow with increasing brightness as incoming messages increase in number. As another example, a team logo may be displayed if a given sports team wins a game, a stock price may be displayed if a predetermined threshold price has been exceeded, a sunshine icon may be displayed if sunny weather is forecast, and/or other information may be displayed on device 10. A user may preselect which types of information are displayed (weather, sports scores, sports results, stock prices, incoming email excerpts or subject lines, text message content, etc.).

As shown in FIG. 4, device 10 may have control circuitry 22. Control circuitry 22 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. The processing circuitry may be based on one or more microprocessors, microcontrollers, digital signal processors, baseband processors, power management units, audio chips, application specific integrated circuits, etc. In some configurations, control circuitry 22 may operate in cooperation with on-line control circuitry (e.g., one or more remote servers, networked computing equipment in a local area network, coupled peer devices, or other remote storage and processing circuitry).

Input-output circuitry in device 10 such as input-output devices 24 may be used to allow data to be supplied to device 10 and to allow data to be provided from device 10 to external devices. Input-output devices 24 may include audio devices 26 such as one or more speakers (e.g., tweeters, midrange speakers, woofers, subwoofers, etc.) and one or more audio sensors (e.g., microphones for gathering voice command input, microphones that measure ambient noise as part of a noise cancellation system, microphones in echolocation sensors, etc.). In some embodiments, audio devices 26 may output audio based on data received from electronic equipment 20. In this way, device 10 may act as an external speaker for device 20. However, this is merely illustrative. Device 10 may also include other input-output devices as desired.

Input-output devices 24 may include light-emitting components. For example, input-output devices can include visual output devices 28 such as display(s) and/or other light sources. Visual output devices 28 may include one or more individual light-emitting devices such as light-emitting diode(s), laser(s), and/or lamp(s). Visual output devices 28 may also include arrays of pixels for forming displays such as liquid crystal displays, organic light-emitting diode displays, displays formed from light-emitting diodes on respective crystalline semiconductor dies (microLEDs), etc. Pixel arrays may include any suitable number of pixels (e.g., at least 100, at least 1000, at least 10,000, at least 100,000, fewer than 1,000,000, etc.).

In some configurations, visual output devices 28 may include arrays of pixels that display images. In other configurations, visual output devices 28 serve as status indicator lights, provide illumination for patterned openings (e.g., openings in the shape of icons, etc.), and/or otherwise provide light-based output without necessarily being able to display images. Because embodiments of visual output devices 28 may include pixel arrays for displaying images, visual output devices 28 may sometimes be referred to as displays 14. This is merely illustrative. If desired, device 10 may include visual output devices based on one or a few light-emitting diodes, lamps, or other light-emitting components that do not display images.

Visual output devices 28 may form displays that are touch sensitive displays or may be insensitive to touch. A touch sensitive display may incorporate a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. If desired, force sensors may overlap the displays (e.g., so that a user may supply force-based input commands by pressing downwards on the display).

Each display may include an array of pixels formed from liquid crystal display (LCD) components, an array of electrophoretic pixels, an array of plasma pixels, an array of organic light-emitting diode pixels or other light-emitting diodes (e.g., micro-light-emitting diodes, light-emitting diodes in plastic packages, etc.), an array of electrowetting pixels, or pixels based on other display technologies.

Input-output devices 24 may also include input component such as buttons, touch sensors (e.g., capacitive touch sensors, optical touch sensors, etc.), force sensors, and/or other devices 32 for receiving input such as button press input and/or touch or force sensor input. Touch sensors may include capacitive and/or resistive touch sensors, as examples.

Sensors 34 may be used in gathering environmental measurements and/or user input and may include ambient light sensors (visible light sensors, color sensitive light sensors, ultraviolet light sensors, etc.), optical proximity sensors, capacitive proximity sensors, temperature sensors (e.g., to measure ambient temperature), force sensors (e.g., for measuring biometric information), gas pressure sensors, heart rate sensors, blood oxygen level sensors (e.g., based on emitted and detected light), electrocardiogram sensors (e.g., sensors for measuring electrical signals on a user's body), particulate sensors (e.g., sensors that use light measurements and/or other measurements to measure particulate concentration in the air), image sensors (cameras), gas pressure sensors, carbon dioxide sensors and/or sensors measuring other gas concentrations, position and/or orientation sensors (e.g., inertial measurement units based on one or more sensors such as accelerometers, gyroscopes, and/or compasses), ultrasonic sensors that measure distance using echolocation (e.g., by emitting ultrasonic signals and detecting corresponding ultrasonic echoes with a microphone), accelerometers for gathering user tap input, sensors that gather hand gestures and other three-dimensional gesture input (e.g., using optical sensing, capacitive sensing, etc.), etc. Audio and/or video feedback may be presented as sensors gather user input. For example, detected hand gestures can be accompanied by audible clicks and/or variations in light output that serve as feedback informing a user that the hand gestures have been successfully detected by device 10.

If desired, device 10 may include other input-output devices such as devices 36 (e.g., gaze detection systems, thermal imaging systems, haptic output devices, etc.). Haptic output devices may include piezoelectric devices, electromagnetic actuators, and/or other actuators for generating haptic output.

Device 10 may include one or more batteries, may include a power converter for converting mains power into internal direct-current power, and/or may include other power circuitry (e.g., wireless power circuitry for receiving wirelessly transmitted power, wireless power circuitry for transmitting wireless power to nearby devices, etc.).

In some configurations, some of all of the outer surface of housing 4 may be permeable to sound. For example, fabric layers with perforations or other openings, and/or other structures that allow sound to pass may be using in forming sidewalls on the sides of housing 4, a wall for an upper surface of housing 4, and/or other housing structures. If desired, multiple layers of material that are permeable to sound may be used in forming the walls of housing 4. For example, device 10 may have an outer fabric layer that is permeable to sound and an inner flexible plastic frame that has openings that allow sound to pass. These sound-permeable structures allow sound from speakers in the interior of housing 4 to pass to the exterior of device 10 and allow sound from the exterior of device 10 to pass to microphones in the interior of device 10. The sound permeable material may also have openings that are configured to pass light from light sources within device 10, such as light-emitted diodes, displays, or any other desired light sources. However, these materials are merely illustrative. In general, any desired materials may be used to form housing 4.

Figure 5:
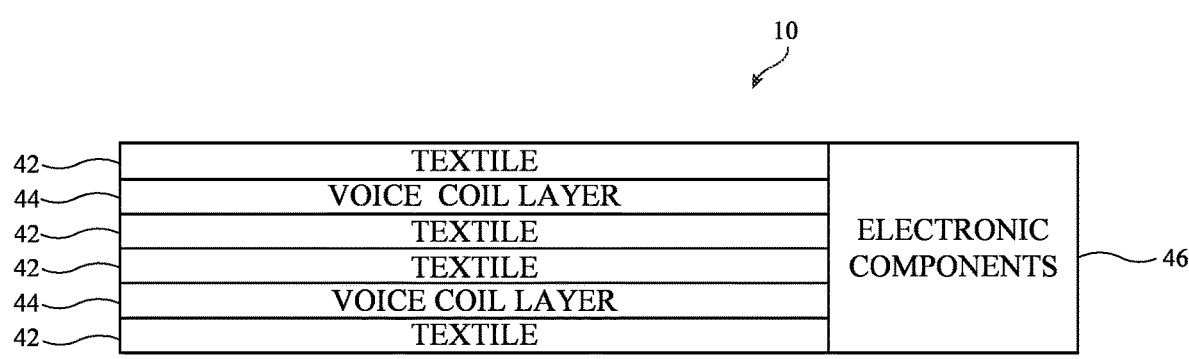
FIG. 5 is a cross-sectional side view of an illustrative flexible electronic device in accordance with an embodiment.

An example of electronic device 10, in which the electronic device includes acoustic components to form a speaker device, is shown in FIG. 5. As shown in FIG. 5, electronic device 10 may be formed from textile layers 42 and voice coil layers 44, with electronic components 46 attached to the ends of textile layers 42 and voice coil layers 44. Textile layers 42 may be formed from acoustically permeable fabric. For example, textile layers 42 may be formed from woven, knitted, or otherwise intertwined fibers, and the fibers may be arranged to allow sound to pass through the textile layers. This may be done by ensuring adequate spacing between the intertwined fibers, selecting a material that is less dense for each fiber, or using any other desired method. In general, textile layers 42 are acoustically permeable.

Voice coil layers 44 may be interposed between textile layers 42 and may output sound through the textile layers 42. In one example, the upper voice coil layer 44 may be configured to output sound in a first direction (e.g., upwards in FIG. 5) and the lower voice coil layer 44 may be configured to output sound in a second direction (e.g., downwards in FIG. 5). However, this is merely illustrative. In general, voice coil layers 44 may output sound in any desired direction. An example of voice coil layers 44 is shown in FIG. 6.

Figure 6:
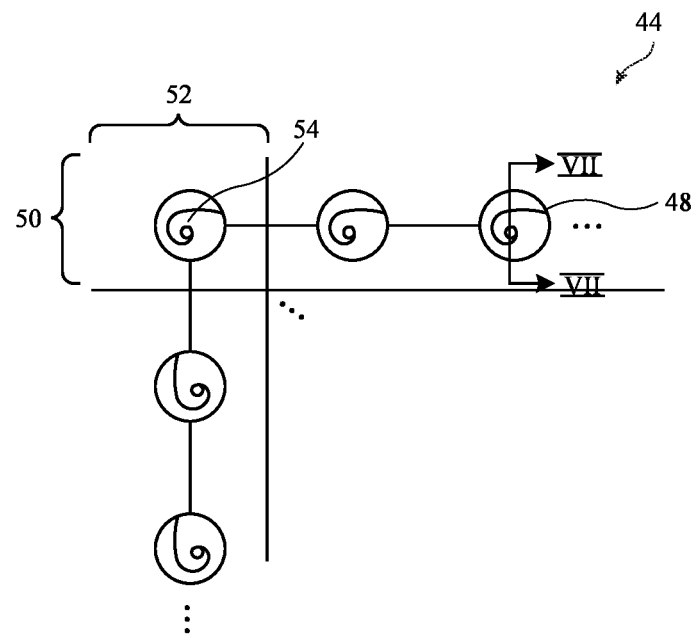
FIG. 6 is a top view of an illustrative voice coil layer that may be incorporated into a flexible electronic device in accordance with an embodiment.

As shown in FIG. 6, voice coil layers 44 may have an array of voice coils 48. In particular, voice coils 48 may be arranged in a mesh speaker array having rows 50 and columns 52. Each voice coil 48 of the array may have an associated magnet 54 that actuates the voice coil and creates sound.

Voice coil layers 44 may be formed from a substrate of acoustically permeable fabric, other desired textiles, polymer, or any other desired flexible material. Voice coils 48 may be embedded in the substrate, stitched into the substrate, printed on the substrate with conductive ink, or otherwise formed on or in the substrate. If desired, voice coil layers 44 may be formed from acoustically permeable fabric and voice coils 48 may be formed from conductive strands that are woven, knitted, or otherwise incorporated into the acoustically permeable fabric. A cross-sectional view of one of voice coils 48 and its associated magnet 54 is shown in FIG. 7.

Figure 7:
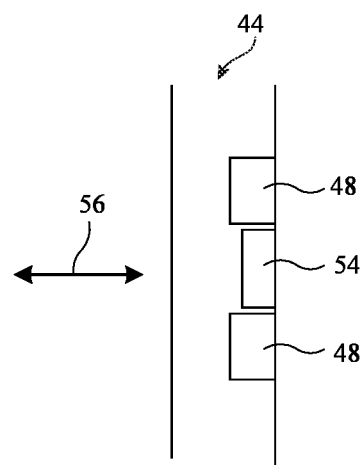
FIG. 7 is a cross-sectional side view of an illustrative voice coil that may be incorporated into the voice coil layer in accordance with an embodiment.

As shown in FIG. 7, voice coil 48 at least partially surrounds magnet 54. Magnet 54 may be a permanent magnet, and voice coil 48 may be driven with a current to create movement of voice coil 48 (e.g., as the magnetic field between voice coil 48 and magnet 54 is produced). Alternatively, magnet 54 may be an electromagnet, if desired. As discussed above, voice coil 48 may be fixed to the substrate of voice coil layer 44, whether by embedding the voice coil, knitting, weaving, or otherwise incorporating conductive fibers into a fabric substrate, or ink printing conductive material onto the substrate. Voice coil 48 may be formed from copper or any other desired conductive material.

Figure 8:
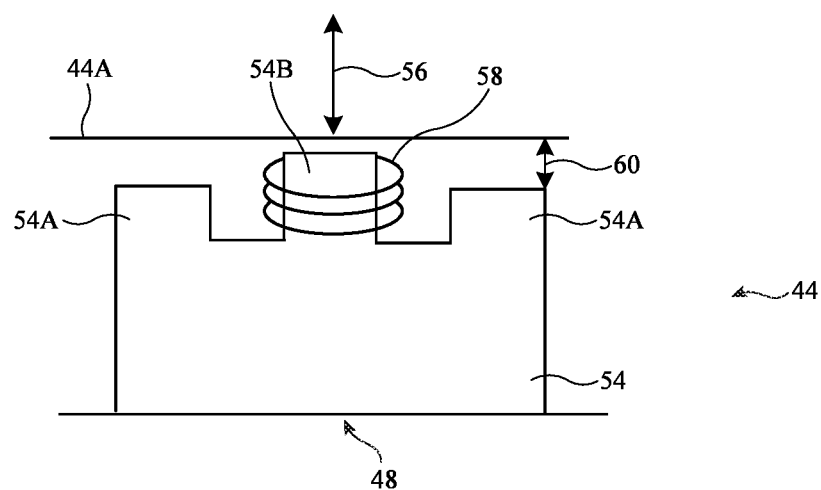
FIG. 8 is a cross-sectional side view of an illustrative voice coil layer that includes permanent magnets and a coils in accordance with an embodiment.

An alternative arrangement of voice coil layer 44 is shown in FIG. 8. As shown in FIG. 8, voice coils 48 in voice coil layer 44 may be formed from a magnet 54 having first magnetic portions 54A and second magnetic portion 54B, and coil 58. Magnet 54 may be attached to a surface of voice coil layer 44, such as a lower layer opposite upper layer 44A. First magnetic portions 54A may have a first polarity (e.g., a south polarity), and second magnetic portion 54 may have a second polarity that is different from the first polarity (e.g., a north polarity). Magnet 54 may be a permanent magnet or may be an electromagnet. In either case, coil 58 may be driven with current to induce a magnetic field, thereby moving upper surface 44A of voice coil layer 44 up and down along direction 56. As upper surface 44A moves, gap 60 may increase and decrease in size. The movement of upper surface 44A may produce acoustic sounds. Magnets 54 and coils 58 may be arranged in a matrix as shown in FIG. 6.

Individual voice coils 48 of voice coil layer 44 may be drive in any desired manner based on device settings, user settings, audio input, sensor input, or any other desired factors. For example, all of the voice coils 48 within the voice coil matrix may be driven in unison, which may increase the low frequency output of device 10. Alternatively, voice coils 48 may be driven on a row-by-row basis or a column-by-column basis, in which a row of voice coils is activated or deactivated as desired. Voice coils 48 may also be driven individually, if desired. However, these arrangements are merely illustrative. In general, voice coils 48 may be driven in any desired manner.

Although the example of FIG. 6 shows voice coils 48 arranged in a matrix of rows 50 and columns, this is merely illustrative. In general, voice coils 48 may be arranged in any desired manner. For example, voice coils 48 may be arranged in a non-uniform manner. Moreover, the array of voice coils may have any desired number of rows and columns, such as one or more rows and one or more columns.

Although FIG. 5 illustrates two textile layers 42 adjacent to one another at the center of device 10, this is merely illustrative. If desired, one or more additional layers may be interposed between the two textile layers 42. For example, using an acoustically impermeable layer or a less acoustically permeable layers between textile layers 42 may improve the performance of electronic device 10 at low frequencies. Alternatively or additionally, a single textile layer 42 may be used between voice coil layers 44 or more than two textile layers 42 may be used between voice coil layers 44, if desired.

As shown in FIG. 5, at one or both ends of textile layers 42 and voice coil layers 44, electronic device 10 may have electronic components 46. Electronic components 46 may include control circuitry (e.g., control circuitry 22 of FIG. 4), communication circuitry (e.g., communications circuitry 38 of FIG. 4), sensors (e.g., sensors 34 of FIG. 4), light sources (e.g., display/other light sources 28 of FIG. 4), power sources (e.g., a battery) and/or any other desired electronic components. For example, electronic components 46 may include wireless communications circuitry to receive signals from an external device, such as device 20, which control circuitry 22 may then use to drive voice coil layers 44 and play audio. However, this is merely illustrative. In general, electronic components 46 may include any desired electronic components, such as any of the components discussed above in connection with FIG. 4.

Electronic components 46 may also have components that allow for attachment to one or more other electronic devices 10. For example, the communications circuitry within device 10 may be able to communicate and synchronize with other devices 10, if desired. Alternatively or additionally, electronic components 46 may have a physical connection in which devices 10 may be connected (e.g., a port or a latching mechanism to connect multiple devices). In this way, multiple electronic devices 10 may be combined to form a larger speaker, if desired.

Although the example of FIG. 5 shows electronic components 46 on one side of device 10, this is merely illustrative. Electronic components 46 may be attached to the opposite side of device 10, both sides of device 10, or any other portion of device 10, as desired. Moreover, although FIG. 5 shows two voice coil layers 44, device 10 may include three or more voice coil layers, four or more voice coil layers, one voice coil layer, five or more voice coil layers, or any other desired number of voice coil layers. Voice coil layers 44 may be used to output audio and/or may be used to provide haptic output to a user. Additionally, electronic device 10 may include any desired number of textile layers 42. Moreover, any other desired components may be included between textile layers 42. For example, visual output devices, such as LEDs, may be included in one or more layers between textile layers 42 (e.g., in the positions designated by voice coil layers 44, adjacent to one of the voice coil layers 44, in between inner textile layers 42, or any other desired position). Alternatively or additionally, any desired sensors, input devices, and/or output devices may be included between textile layers 42. For example, device 10 may include additional flexible layers between textile layers 42 that include light-emitting components, input sensors, or any other desired input-output devices. In embodiments in which LEDs or other devices are included between textile layers 42, textile layers 42 may be configured to allow light or other input-output signals to pass through the textile material (e.g., the spacing/density of the textile material may be configured to pass the desired signals or openings may be formed in the textile to permit the signals to pass through).

Figure 9:
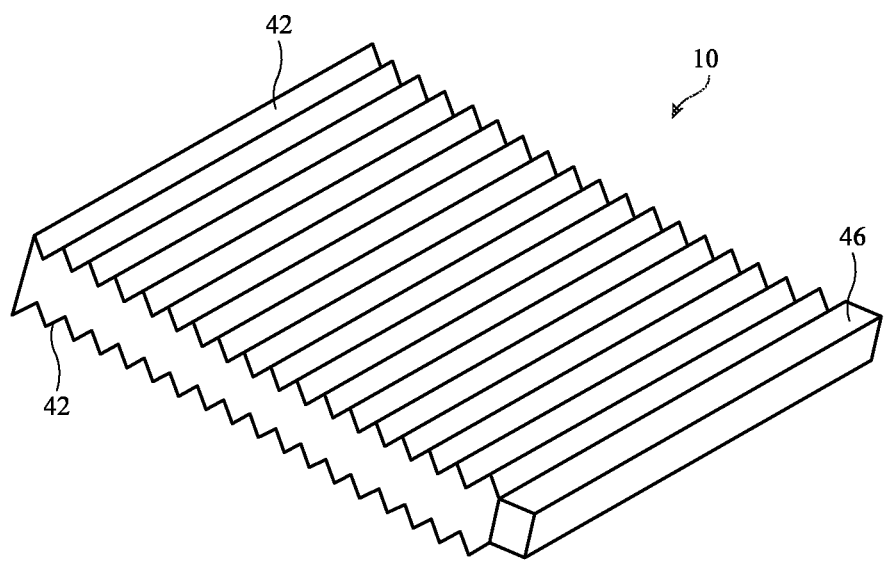
FIG. 9 is a perspective view of an illustrative flexible electronic device having an accordion-shape in accordance with an embodiment.

A perspective view of an electronic device of the type shown in FIG. 5 is shown in FIG. 9. As shown in FIG. 9, device 10 may have outer textile layers 42 on the bottom and top of the device. Device 10 may also have electronic component box 46 at the edge of textile layers 42. Electronic component box 46 may be made from any desired material, such as polymer or metal. In general, electronic component box 46 may be rigid or flexible, as desired. Other layers, such as voice coil layers 44 and other textile layers 42 may be included between outer textile layers 42, if desired. An illustrative stack up of this type is shown in FIG. 5.

As shown in FIG. 9, outer textile layers 42 may have an accordion fold shape. Having an accordion shape may allow textile layers 42 to expand and collapse when desired (e.g., when stretched or compressed by a user of device 10). Alternatively or additionally, the accordion fold shape of textile layers 42 may allow for improved flexibility of device 10.

Although not shown in FIG. 9, other layers within device 10 may similarly have accordion fold shapes. For example, the inner textile layers 42 of FIG. 5 and/or voice coil layers 44 may have accordion fold shapes to further enhance flexibility.

Although an accordion fold shape is shown in FIG. 9, this shape is merely illustrative. In general, any desired shape may be used for layers 42 and/or layers 44 of device 10. For example, layers 42 and/or layers 44 may have mesh shapes to help promote flexibility. In other embodiments, other fold shapes may be used, such as a bi-fold shape, a tri-fold shape, or any other desired shape. Moreover, some layers within device 10 may have a first flexibility promotion arrangement (e.g., a mesh shape or a fold), while other layers within device 10 have a second flexibility promotion arrangement that is different from the first.

Figure 10A:
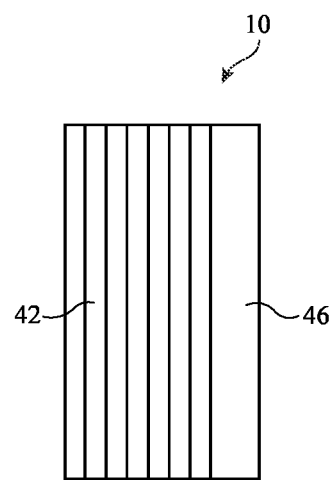
FIG. 10A is a top view of an illustrative flexible electronic device in a collapsed state in accordance with an embodiment.

Various arrangements (also referred to as states herein) of electronic device 10 are shown in FIGS. 10A-E. As shown in FIG. 10A, device 10 may have a collapsed arrangement. In particular, layer 42 may be collapsed together to reduce a lateral dimension of device 10. If layer 42 has an accordion fold shape, each of the accordion folds may be in a closed position to collapse device 10. If layer 42 has a different shape, layer 42 may be collapsed according to the shape to reduce the lateral dimension of device 10. Electronic component box 46 may move with the edge of layer 42 and remain adjacent to collapsed layer 42. In some embodiments, device 10 may be collapsed to allow for easier transportation of the device. However, device 10 may also be used (e.g., turned on and used to produce output or detect input) in the collapsed state if desired. For example, music may be played out of device 10 or sensors within device 10 may detect user touch input in the collapsed state if desired.

Figure 10B:
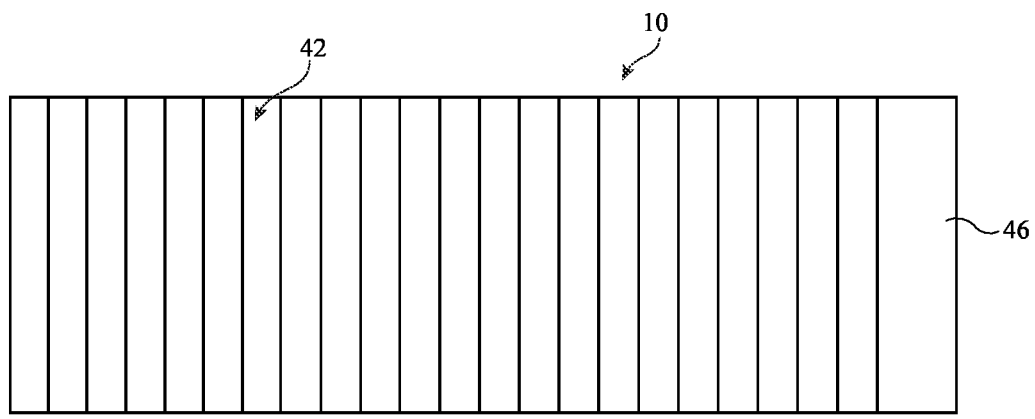
FIG. 10B is a top view of an illustrative flexible electronic device in a stretched state in accordance with an embodiment.

Another arrangement of device 10 is shown in FIG. 10B. As shown in FIG. 10B, device 10 may be expanded to increase the lateral dimension of the device. For example, if layer 42 has an accordion fold shape, each of the accordion folds may be opened/stretched to expand device 10. If layer 42 has a different shape, layer 42 may be expanded according to the shape to expand the lateral dimension of device 10. Expanding device 10 may allow for using the device. For example, placing device 10 into an expanded configuration may allow for audio to be outputted from the front (and/or rear) face of the device (e.g., if device 10 includes voice coil layer(s) 44 of FIG. 5). Additionally or alternatively, expanding device 10 may allow device 10 to display information to a user (e.g., if a display layer is included below/behind layer 42).

Although FIG. 10B shows all of the accordion folds of layer 42 being in an open configuration, this is merely illustrative. One or more portions of device 10 may be placed in an expanded configuration, while one or more other portions of device 10 are left in a collapsed configuration, if desired.

If desired, device 10 may be oriented vertically when placed in the expanded configuration, rather than oriented horizontally as shown in FIG. 10B. For example, device 10 may be attached to a window or other opening of a house, vehicle, or other structure and function as a shade to block light from entering the structure while providing the desired functionality of device 10 (e.g., audio playback). Although not shown in FIG. 10B, whether device 10 is oriented horizontally or vertically, a support structure may be used to provide support to device 10. For example, an external support structure, such as a stand, may be used to support device 10 when in the expanded configuration. Additionally or alternatively, a support structure may be built into device 10 (e.g., along the top and bottom edges of device 10, perpendicular to electronic component box 46), that may expand with device 10 and support the device when expanded. A supports structure of this type may be a bistable support structure (e.g., a support structure that is stable in both the expanded and collapsed states), for example.

Figure 10C:
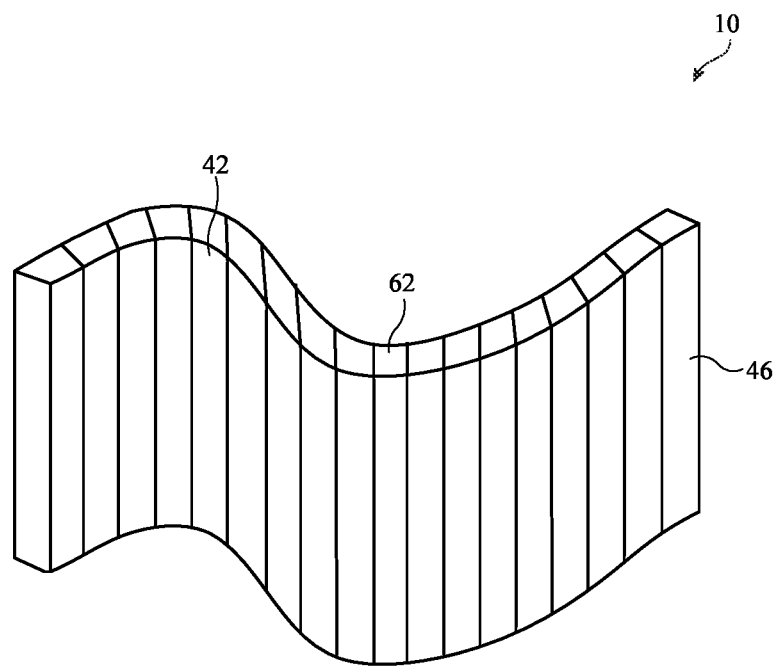
FIG. 10C is a top view of an illustrative flexible electronic device that may be stretched in multiple directions in accordance with an embodiment.

In addition to, or instead of, being placed in an expanded configuration, device 10 may be bent in multiple directions. As shown in FIG. 10C, one or more folds of layer 42 may be placed in open/expanded configurations. Additionally, top surface 62 may be bent into a serpentine shape (e.g., into and out of the page of FIG. 10C). In this configuration, device 10 may function as in the expanded state of FIG. 10B, with additional flexibility provided by the more flexible shape. For example, having the device in a serpentine shape may allow the device to support itself on a table or other surface. However, the serpentine shape of FIG. 10C (as well as the serpentine fold shape of layer 42) is merely illustrative. If desired, device 10 may be bent into any desired shape, such as a box shape, a circular shape, a triangular shape, etc.

If desired, multiple devices (e.g., multiple devices 10) may be attached end to end to form a continuous device. For example, devices 10 may have an attachment structure on the opposite edge from component box 46, may have an attachment structure within component box 46, and/or may have any other built-in attachment structure. These attachment structures may be used to attach multiple devices end-to-end, top-to-bottom, or in any other desired configured to form a continuous device (e.g., a speaker with additional surface area). The multiple devices may operate individually, or may communicate through communications circuitry, such as communications circuitry 38 of FIG. 4, to work synchronously (e.g., to play the same sound or audio simultaneously).

Additionally, device 10 may have any desired scale. For example, device 10 may be a table-top device when in an expanded configuration and a travel-sized device when in a collapsed configuration. Alternatively, device 10 may be larger, forming a temporary room divider and/or wall, cubical wall, or other structure in the expanded configuration. However, these examples are merely illustrative. In general, any desired size/scale may be used for device 10.

Figure 10D:
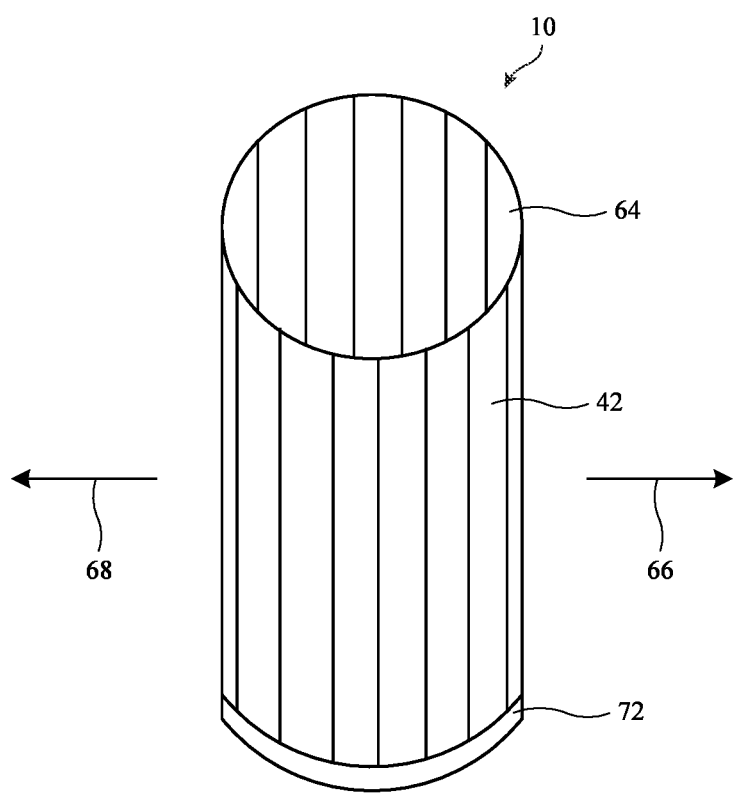
FIG. 10D is a perspective view of an illustrative flexible electronic device in a cylindrical orientation in accordance with an embodiment.

As shown in FIG. 10D, device 10 may be placed in a cylindrical configuration. In this configuration, if layer 42 is formed with accordion folds, at least some of the accordion folds may be opened/expanded, and the device may be placed in a circle with the two ends of the device (e.g., the end of device 10 with electronic component box 46 and the opposing end of the device in FIG. 5). If layer 42 has a different shape, at least a portion of layer 42 may be expanded according to the shape to expand the lateral dimension of device 10 to allow device 10 to be placed in a cylindrical configuration.

In the cylindrical configuration, device 10 may provide output (e.g., acoustic output or visual output) in an outward direction relative to the cylindrical configuration, as shown by directions 66 and 68. Device 10 may provide output 365° around the device, 180° around the device, 90° around the device, or any other desired portion of the device. In some examples, device 10 may output from multiple sections of the device, such as opposing portions of the device, based on user settings and sensor input. For example, sensors in device 10 may determine whether a user or external object is located and position the output to be directed toward one or more users or to avoid one or more external objects. However, this is merely illustrative. In general, output from device 10 may be directed in any desired manner, including toward inward face 64.

If desired, device 10 may have smart device capabilities and/or automation capabilities. For example, electronic components box 46 (which may be positioned at any position along the cylinder defined by the cylindrical configuration) may include speakers, microphones, cameras, and any other desired devices. Device 10 may use the components to gather voice input, touch input, visual input, or any other desired input from one or more users. In response to the input, device 10 may take a desired action, such as play music, control other equipment (e.g., a television, a smartphone, a computer, a thermostat, a smart device, or any other device), display a desired image or video, or take any other desired action. In general, device 10 may gather user input and/or control external equipment when device 10 is any desired configuration.

In the example of FIG. 10D, device 10 is supported by a stand 72. However, this is merely illustrative. Device 10 may rest directly on the top or bottom surface of the cylinder (e.g., the top or bottom edges of layer 42), may be rested on its side (e.g., on a portion of layer 42), or may be placed in any other desired position. In some embodiments, stand 72 may be built into device 10. For example, stand 72 may be a flexible or bistable member that runs along the top or bottom edge of textile layer 42, bending to match the configuration of the device. In some examples, electronic component box 46 may be formed from flexible materials, such as a flexible housing and flexible electronic components, and may form stand 72.

Figure 10E:
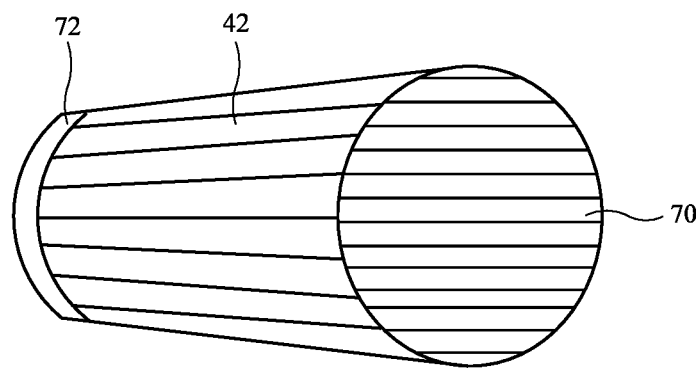
FIG. 10E is a perspective view of an illustrative flexible electronic device in a conical orientation in accordance with an embodiment.

As shown in FIG. 10E, device 10 may be in a conical configuration. In particular, at least a portion of layer 42 may be opened/expanded similar to the cylindrical configuration of FIG. 10D. However, end 70 may have a larger diameter than the end at stand 72 (or vice versa) to place device 10 into a conical configuration. In this configuration, device 10 may output audio as a loudspeaker (e.g., out of upper end 70) by outputting the audio toward the inside of the conical configuration. If desired, device 10 may output a visual indicator on the outer surface of the conical configuration. However, this is merely illustrative. Device 10 may output audio, visual indicators, and/or any other desired output in any desired manner.

Although some configurations of device 10 have been shown in FIGS. 10A-10E, these configurations are merely illustrative. In general, device 10 may be folded, bent, expanded, collapsed, opened, and/or closed in any desired manner. Additionally, device 10 may be supported by built-in support structures, such as electronic components box 46) and/or any external support structures, such as a stand, as desired. Moreover, although FIGS. 10A-10E show device 10 as a standalone device, this is merely illustrative. The expanded and collapsed states of device 10 (and the intermediate states between fully expanded and collapsed) may give device 10 additional flexibility when incorporated into a case, garment, watch band, or any other desired fabric item. In this way, device 10 may have sufficient flexibility to be bent, stretched, and configured, as desired, while maintaining the functionality of the internal electronic components (e.g., without stressing the components or interconnects between the components too much as to damage the components). For example, any input-output components, such as acoustic components and light-emitting components, may have preserved functionality while the device remains flexible.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A fabric-based electronic device that outputs information to a user in response to signals from an external device, the fabric-based electronic device comprising:
   a flexible layer comprising a plurality of voice coils formed on the flexible layer;
   an acoustically permeable textile layer that is coupled to and that overlaps the flexible layer, wherein the flexible layer and the acoustically permeable textile layer are configured to expand and compress in a first direction and are configured to bend in a second direction that is perpendicular to the first direction; and
   control circuitry coupled to the voice coils, wherein the control circuitry is configured to output sound from the voice coils in response to the signals from the external device.

2. The fabric-based electronic device defined in claim 1 wherein the acoustically permeable textile layer and the flexible layer are configured to expand and contract, wherein the flexible layer is a first flexible layer and the acoustically permeable textile layer is a first acoustically permeable textile layer, the fabric-based electronic device further comprising:
- a second flexible layer with a second plurality of voice coils formed on the second flexible layer;
- a second acoustically permeable textile layer interposed between the first and second flexible layers;
- a third acoustically permeable textile layer through which the second plurality of voice coils outputs sound; and
- a third flexible layer with at least one light source coupled to the third flexible layer, wherein the third flexible layer is interposed between the first and second acoustically permeable textile layers and is configured to output light through a selected one of the first acoustically permeable textile layer or the second acoustically permeable textile layer.

3. The fabric-based electronic device defined in claim 1 wherein the acoustically permeable textile layer and the flexible layer each have at least one fold along which the fabric-based electronic device is configured to be folded into a folded configuration and unfolded into an expanded configuration.

4. The fabric-based electronic device defined in claim 3 wherein each voice coil of the plurality of voice coils surrounds a permanent magnet that is coupled to the flexible layer.

5. The fabric-based electronic device defined in claim 4 wherein the flexible layer is a fabric layer and wherein each of the voice coils is formed from conductive fibers that are incorporated into the fabric layer.

6. The fabric-based electronic device defined in claim 4 wherein each of the voice coils is formed from conductive material that is ink printed onto the flexible layer.

7. The fabric-based electronic device defined in claim 4 wherein the flexible layer comprises first and second opposing surfaces, wherein each of the permanent magnets has a first portion that is surrounded by a respective one of the voice coils and has a second portion that surrounds the voice coil, wherein each of the permanent magnets is attached to the first surface of the flexible layer and wherein each of the voice coils is attached to the second surface of the flexible layer.

8. The fabric-based electronic device defined in claim 1 wherein the flexible layer and the acoustically permeable textile layer are configured to bend into a cylindrical configuration.

9. The fabric-based electronic device defined in claim 8 wherein the plurality of voice coils is configured to output the sound outwardly with respect to an edge of a cylinder defined by the cylindrical configuration.

10. The fabric-based electronic device defined in claim 1 wherein the flexible layer and the acoustically permeable textile layer are configured to bend into a conical configuration.

11. The fabric-based electronic device defined in claim 10 wherein the plurality of voice coils is configured to output the sound inwardly with respect to an edge of a cone defined by the conical configuration.

12. A fabric-based electronic device that outputs information to a user in response to signals from an external device, the fabric-based electronic device comprising:
- a flexible layer comprising a plurality of voice coils formed on the flexible layer;
- an acoustically permeable textile layer that is coupled to and that overlaps the flexible layer;
- control circuitry coupled to the voice coils, wherein the control circuitry is configured to output sound from the voice coils in response to the signals from the external device; and
- a sensor that gathers input from the user, wherein the control circuitry is configured to modify the output sound based on the input.

13. The fabric-based electronic device defined in claim 12 wherein the sensor is selected from the group of sensors consisting of: a proximity sensor, a touch sensor, an optical sensor, and a camera.

14. An apparatus comprising:
- a fabric-based article; and
- an electronic device coupled to the fabric-based article, wherein the electronic device comprises:
  - first and second outer textile layers that are acoustically permeable;
  - first and second voice coil layers that respectively emit sound through the first and second outer textile layers;
  - an inner textile layer interposed between the first and second voice coil layers;
  - communications circuitry that is configured to receive signals from an external device; and
  - control circuitry that is configured to drive the first and second voice coil layers to produce the sound in response to the received signals.

15. The apparatus defined in claim 14 wherein the fabric-based article is a garment selected from the group consisting of: a shirt, a dress, a jacket, pants, and an undergarment.

16. The apparatus defined in claim 14 wherein the fabric-based article is a cover that is configured to attach to the electronic device.

17. The apparatus defined in claim 14 wherein the electronic device is a wristwatch device and wherein the fabric-based article is a strap that is configured to attach to the wristwatch device.

18. An electronic device comprising:
- first and second outer textile layers;
- first and second voice coil layers that output sound through the first and second outer textile layers;
- a flexible layer having a plurality of light-emitting diodes coupled to the flexible layer, wherein the plurality of light-emitting diodes outputs light through the first outer textile layer, and wherein the first and second outer textile layers, the first and second voice coil layers, and the flexible layer are configured to be moved between a first expanded configuration and a second collapsed configuration; and
- control circuitry coupled to the first and second voice coil layers and to the plurality of light-emitting diodes, wherein the control circuitry is configured to drive the voice coil layers and the light-emitting diodes to produce the output sound and the output light.

19. The electronic device defined in claim 18 wherein the plurality of light-emitting diodes forms a display that displays images through the first outer textile layer.

* * * * *